(12) United States Patent
Rodrigues et al.

(10) Patent No.: US 8,443,375 B2
(45) Date of Patent: May 14, 2013

(54) LOCKLESS QUEUES

(75) Inventors: Roberto Rodrigues, Herndon, VA (US); Suresh Bhogavilli, Gaithersburg, MD (US)

(73) Assignee: Verisign, Inc., Reston, VA (US)

( * ) Notice: Subject to any disclaimer, the term of this patent is extended or adjusted under 35 U.S.C. 154(b) by 307 days.

(21) Appl. No.: 12/637,166

(22) Filed: Dec. 14, 2009

(65) Prior Publication Data

US 2011/0145835 A1   Jun. 16, 2011

(51) Int. Cl.
   *G06F 3/00*   (2006.01)
(52) U.S. Cl.
   USPC ............................ 719/312; 719/313; 719/314
(58) Field of Classification Search ........................ None
   See application file for complete search history.

(56) References Cited

U.S. PATENT DOCUMENTS

| | | | |
|---|---|---|---|
| 6,615,216 B1 * | 9/2003 | Hu ............................................ | 1/1 |
| 2002/0194390 A1 * | 12/2002 | Elving ............................ | 709/312 |
| 2003/0140085 A1 * | 7/2003 | Moir et al. ..................... | 709/107 |
| 2004/0088702 A1 * | 5/2004 | Garthwaite et al. ........... | 718/100 |
| 2006/0005191 A1 * | 1/2006 | Boehm ......................... | 718/100 |
| 2006/0123156 A1 * | 6/2006 | Moir et al. ..................... | 710/33 |
| 2007/0157214 A1 * | 7/2007 | Martin et al. ................. | 719/315 |
| 2007/0169123 A1 * | 7/2007 | Hopkins ....................... | 718/100 |
| 2007/0263650 A1 * | 11/2007 | Subramania et al. ......... | 370/412 |
| 2009/0249356 A1 * | 10/2009 | He et al. ........................ | 719/314 |
| 2010/0192161 A1 * | 7/2010 | Eilebrecht ..................... | 719/314 |

* cited by examiner

*Primary Examiner* — Emerson Puente
*Assistant Examiner* — Sisley Kim
(74) *Attorney, Agent, or Firm* — MH2 Technology Law Group, LLP

(57) ABSTRACT

A method for passing data from a first processing thread to a second processing thread, wherein the first processing thread produces data to be processed by the second processing thread. The data from the first processing thread may be inserted into objects that in turn are inserted into a queue of objects to be processed by the second thread. The queue may be a circular array, wherein the array includes a pointer to a head and a pointer to a tail, wherein only the first processing thread modifies the tail pointer and only the second processing thread modifies the head pointer.

22 Claims, 8 Drawing Sheets

LOCKLESS QUEUES

BACKGROUND OF THE INVENTION

A computer program may be executed by sending an ordered sequence of instructions to a central processing unit (CPU). A computer may contain a number of CPUs. Each CPU may contain a number of execution cores. On a computer with a single CPU with a single core, an operating system may allow the creation of a number of execution threads to simulate the ability to execute a number of programs at the same time. There are a number of ways of mediating access to the CPU for the different execution threads. One way is for the operating system to allow each execution thread to execute a number of instructions before it is preempted by another thread which is then allowed to execute the same number of instructions. On systems with more than one CPU or more than one execution core per CPU, it is possible to use the same mechanism to allow a greater number of threads than available cores.

When there is more than one execution core, two different threads may be executed at exactly the same time. If two or more threads are accessing the same piece of data, simultaneous execution may lead to unexpected results. Similar problems may also occur when there is only one execution core if threads are preempted in such a way that one accesses data to which another thread expects to have exclusive access.

A computer program may split tasks of different character into different execution threads. In so doing it is important to ensure that the different threads synchronize their access to memory. A computer process may be split into two threads in such a way that one thread outputs packets of data to be processed by the second thread. Without a buffer in between, both threads would be limited to execute at the rate of the slowest thread. When implementing a buffer between the threads it is necessary to ensure that the threads' access to the buffer is synchronized in such a way that there is no data loss.

A buffer can be implemented as a linear queue of objects, where the first thread inserts an object into one end of the queue and the second thread pulls objects from the opposite end of the queue.

When two threads access the queue simultaneously a number of problems can occur. If the first thread overwrites an object in the queue before the second thread has processed it, data loss may occur. Secondly, if objects used to carry data are not recycled properly, memory leaks and memory fragmentation may cause a serious reduction in performance.

One method of preventing inconsistent access to the queue object is to use programmatic locks. A lock enables a thread to obtain exclusive access to a section of memory for a period of time. For example, the first thread could lock the queue, insert an object, and unlock it. During this period, the second thread would not be able to access the queue. Similarly, the second thread would lock the queue, remove an object from the queue, and unlock it. This approach removes some of the benefits of multi-threading, and can cause significant performance penalties.

One example of a computer program where one thread passes information to a second thread is a web server. A web server may contain at least one worker thread and at least one logging thread, where the working thread receives and responds to Hypertext Transfer Protocol (HTTP) requests and the logging thread produces a log with summary information about each request and its respective response. The worker thread may package information about a request and its response into an object and pass it to the logging thread. The logging thread may then write the corresponding log entry to disk.

It will take the worker thread a number of CPU cycles to produce a response to the HTTP request; the information about the request relevant for the log may accordingly be available at an earlier stage than the information about the response. In order to aggregate the information about the request and the response into a single log entry the two must at some stage be aggregated. This may have an impact on performance.

BRIEF SUMMARY OF THE INVENTION

The present invention is a method for passing data from a first processing thread to a second processing thread, wherein the first processing thread produces data to be processed by the second processing thread. The data from the first processing thread may be inserted into objects that in turn are inserted into a queue ob objects to be processed by the second thread. The queue may be a circular array, wherein the array includes a pointer to a head and a pointer to a tail, wherein only the first processing thread modifies the tail pointer and only the second processing thread modifies the head pointer.

BRIEF DESCRIPTION OF THE DRAWINGS

FIG. 2 further shows a logical representation of the same queue.

FIG. 8 shows an embodiment of the invention as implemented by a web server receiving HTTP requests. At step 801, memory is allocated for storing data-carrying objects. At step 803, a number of data-carrying objects sufficient to fill the memory are created; these objects are stored in the allocated memory. At step 805, a stack for holding empty data-carrying objects is created. At step 807, pointers to each of the data-carrying objects in the block of memory are inserted into the stack. At step 809, a queue is created that has a finite capacity. This queue is created to act as a buffer for data-carrying objects to be processed by a logging thread. The queue also contains an array, a pointer to the head of the queue, and a pointer to the tail of the queue. The head of the queue is the location of the next data-carrying object to be processed by the logging thread and the tail of the queue is the location of the last object inserted into the queue. At step 811, a first HTTP request is received. At step 813, a first data-carrying object is retrieved from the stack. At step 815, the first data-carrying object is at least partially populated with information based upon the HTTP request. At step 817, the HTTP request is responded to. In step 819, a determination is made that a second data-carrying object in the queue has been processed by the logging thread. In step 821, the second data-carrying object is moved from the queue to the top of the stack. The first data-carrying object is inserted into the queue, at the position formerly occupied by the second data-carrying object, at step 823. The pointer to the tail of the queue is then updated to point to the position of the first data-carrying object in step 825. At step 827, a second HTTP request is received. At step 829, the second data- carrying object is retrieved from the stack. At step 831, the second data-carrying object is at least partially populated with information based upon the second HTTP request. At step 833, the second HTTP request is responded to. At step 835, it is discovered that there is no space available in the queue to insert the second data-carrying object. The second data-carrying object is then inserted back into the stack at step 837. At step 839, a third HTTP request is received. At step 841, the second data-carrying object is retrieved from the stack. At step 843, the second data-carrying object is at least partially populated with information based upon the third HTTP request. At step 845, the third HTTP request is responded to.

DETAILED DESCRIPTION OF THE INVENTION

Figure 1:
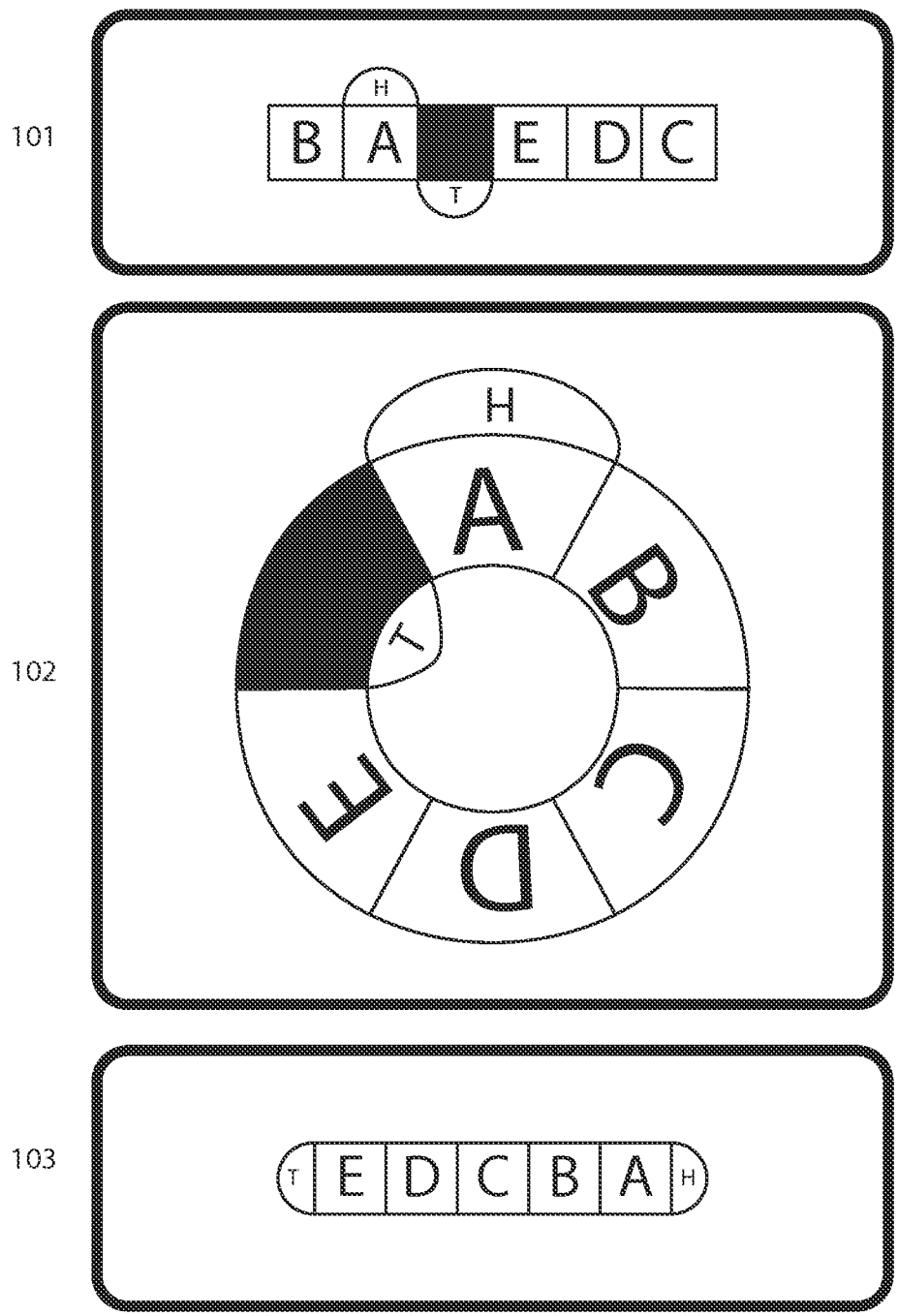
FIG. 1 shows a physical representation of a queue in an embodiment of the invention (101) a circular representation of the same queue (102) and a logical representation of the queue (103).
Figure 2:
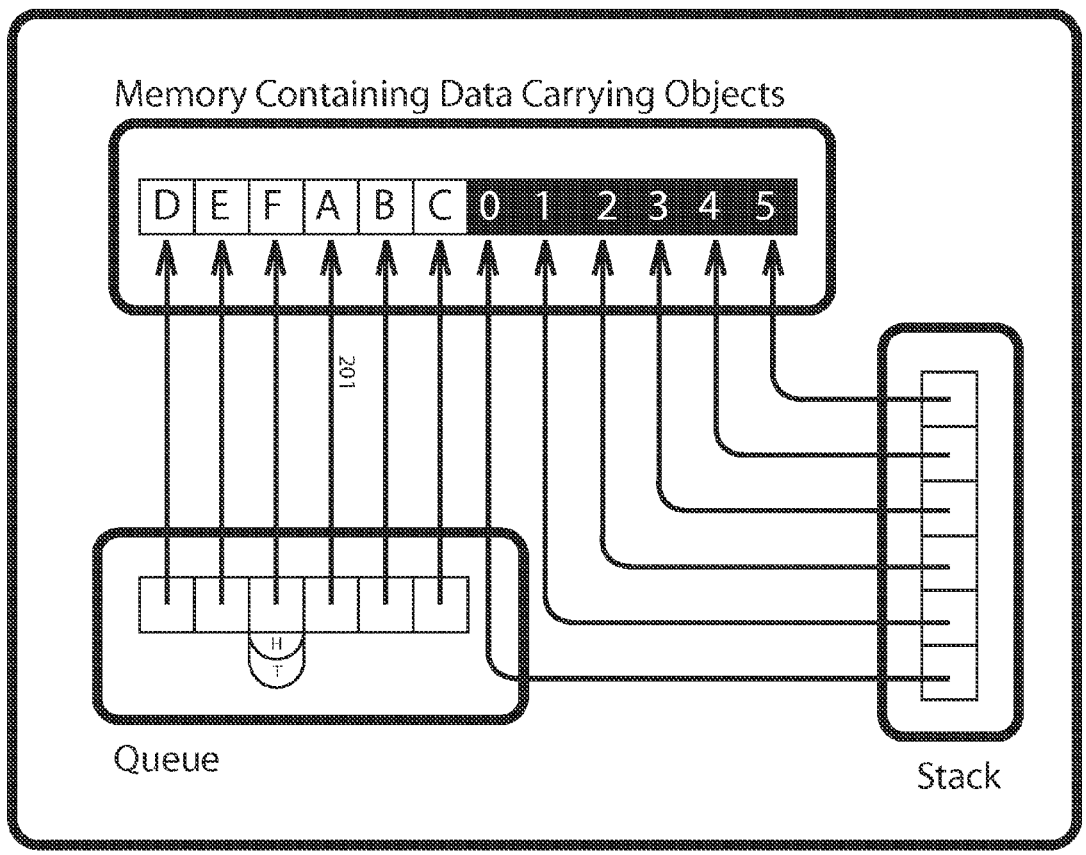
FIG. 2 shows a physical representation of a queue in an embodiment of the invention. The queue contains the elements A, B, C, D, E and F where A is the element at the head of the queue and F is the element at the tail of the queue. (201) is a pointer from the head location of the queue to a data carrying object containing the data "A".
Figure 2:
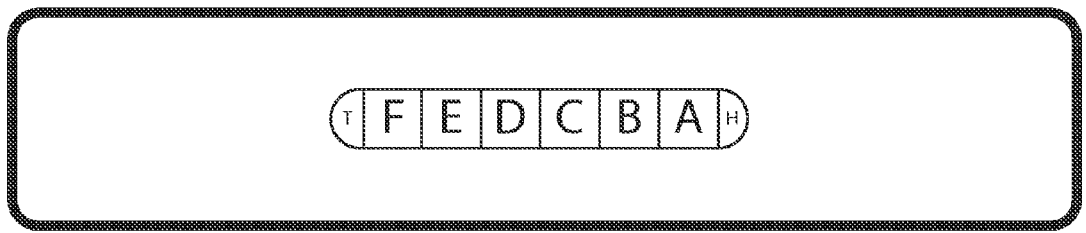
Figure 3:
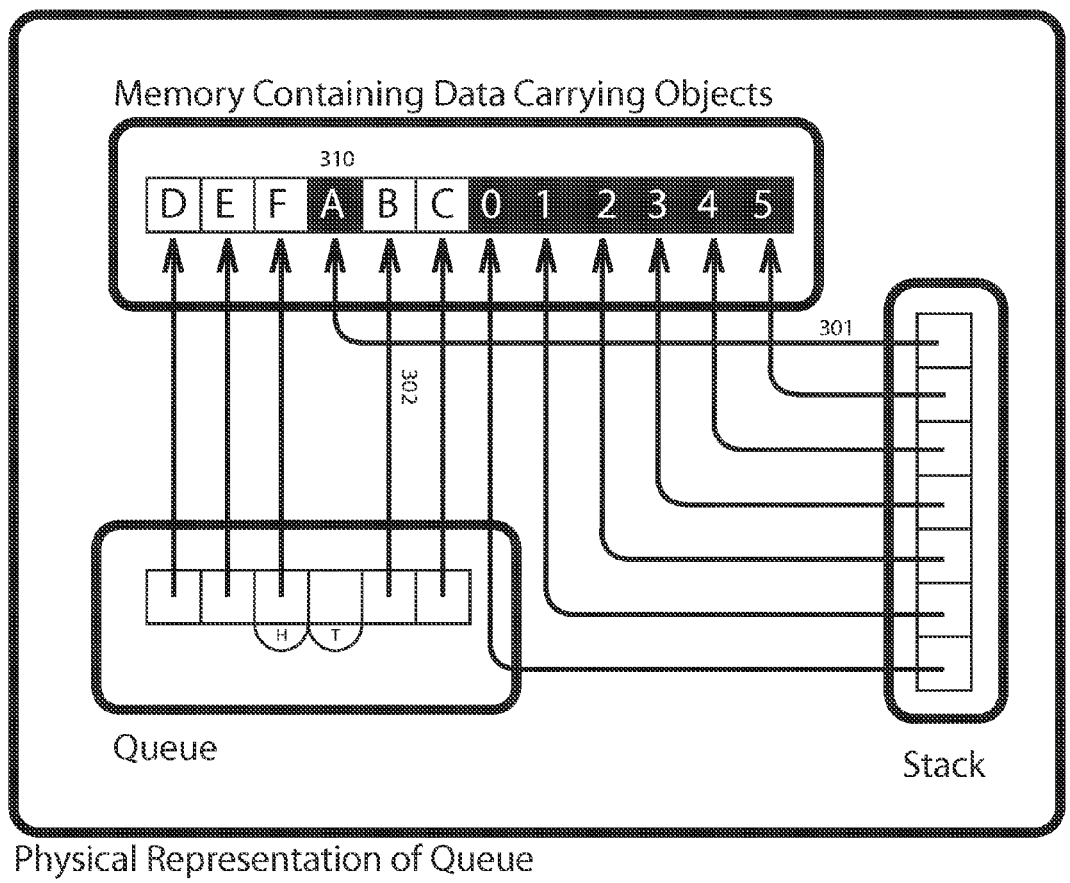
FIG. 3 shows the queue from FIG. 2, but with the element at the head (A) removed. The pointer from the head position of the queue (201) is deleted and a pointer (301) to the same data carrying object is inserted into the stack of objects ready to be used.
Figure 3:
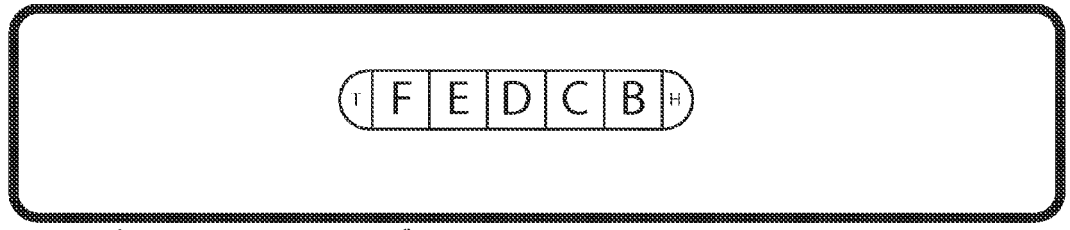
Figure 4:
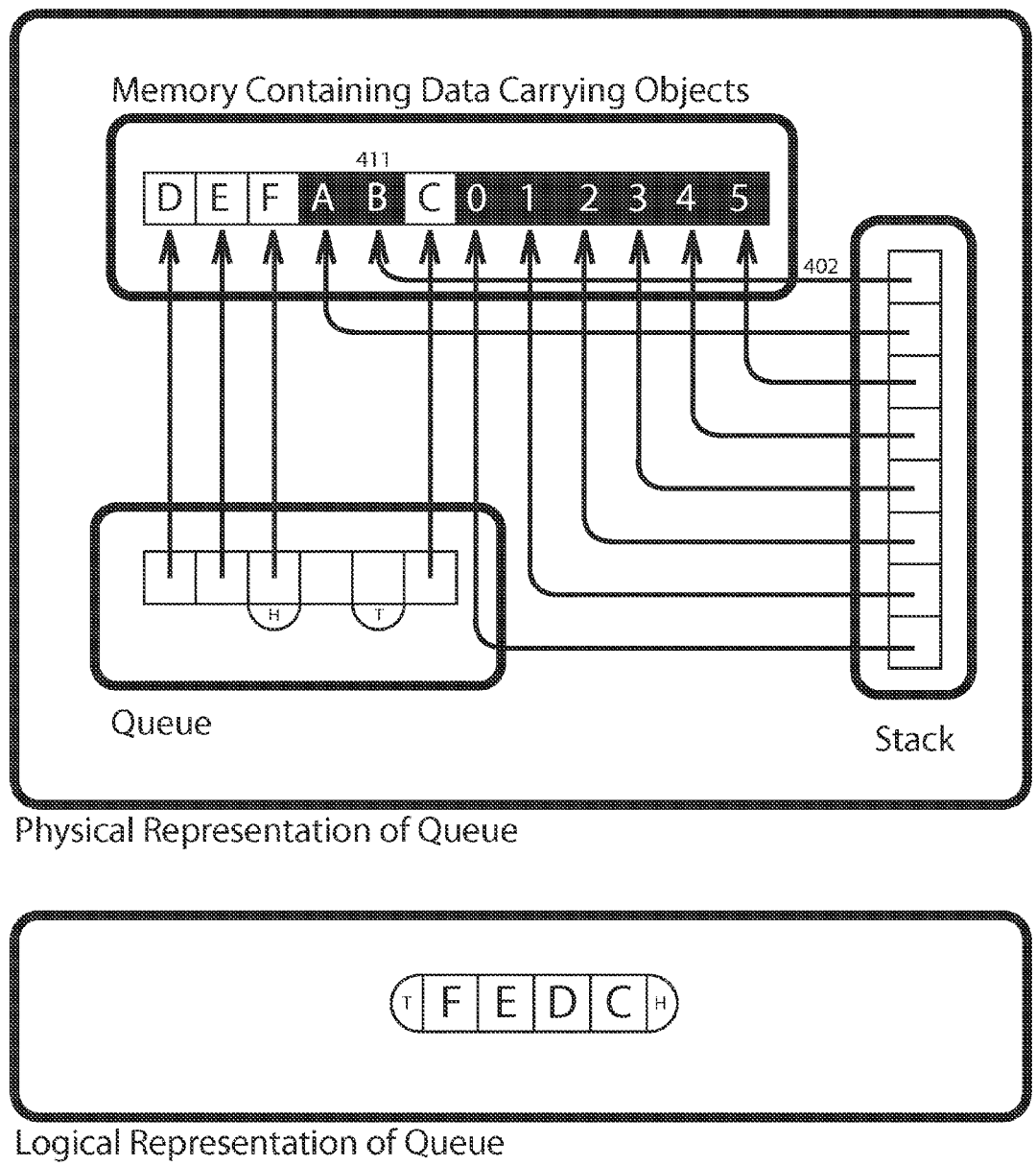
FIG. 4 shows the queue from FIG. 3, but with the element at the head (B) removed. The pointer from the head position of the queue (302) is deleted and a pointer (402) to the same data carrying object is inserted into the stack of objects ready to be used.
Figure 5:
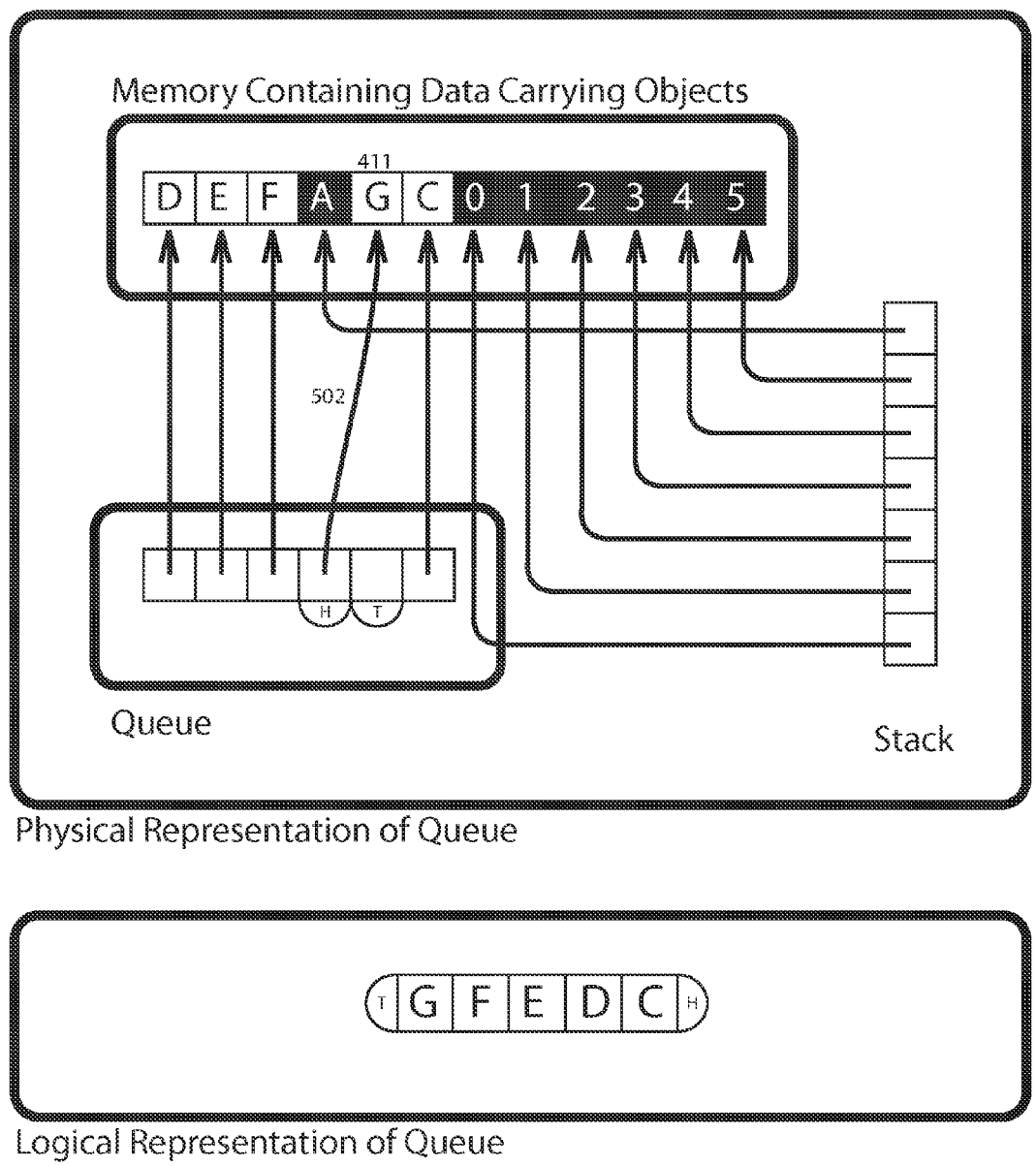
FIG. 5 shows the queue from FIG. 4, but with a new data written into the data carrying object (411) that was at the top of the stack of objects ready to be used. The pointer from the top position of the stack (402) is deleted and a pointer (502) to the same data carrying object is inserted into the queue.
Figure 6:
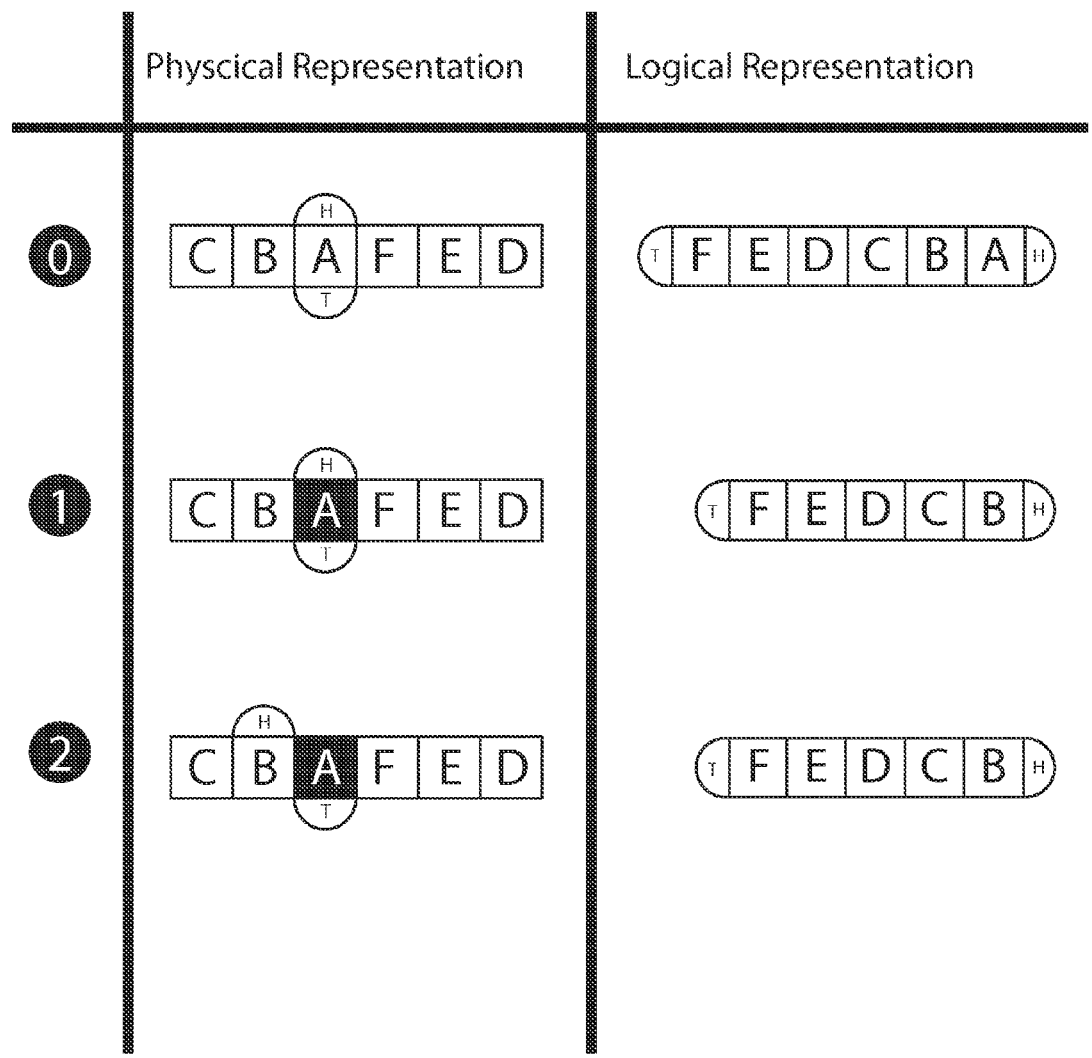
FIG. 6 shows the removal of a data carrying object carrying the data "A" from a queue containing the elements A, B, C, D, E and F where A is at the head of the queue and F is at the tail in an embodiment of the invention. At step 1, the data carrying object (A) has been marked as consumed by the second processing thread, and at step 2, the head pointer of the queue has been moved by the second processing thread. The queue is full at step 0, and ready to have another object inserted at step 2.
Figure 7:
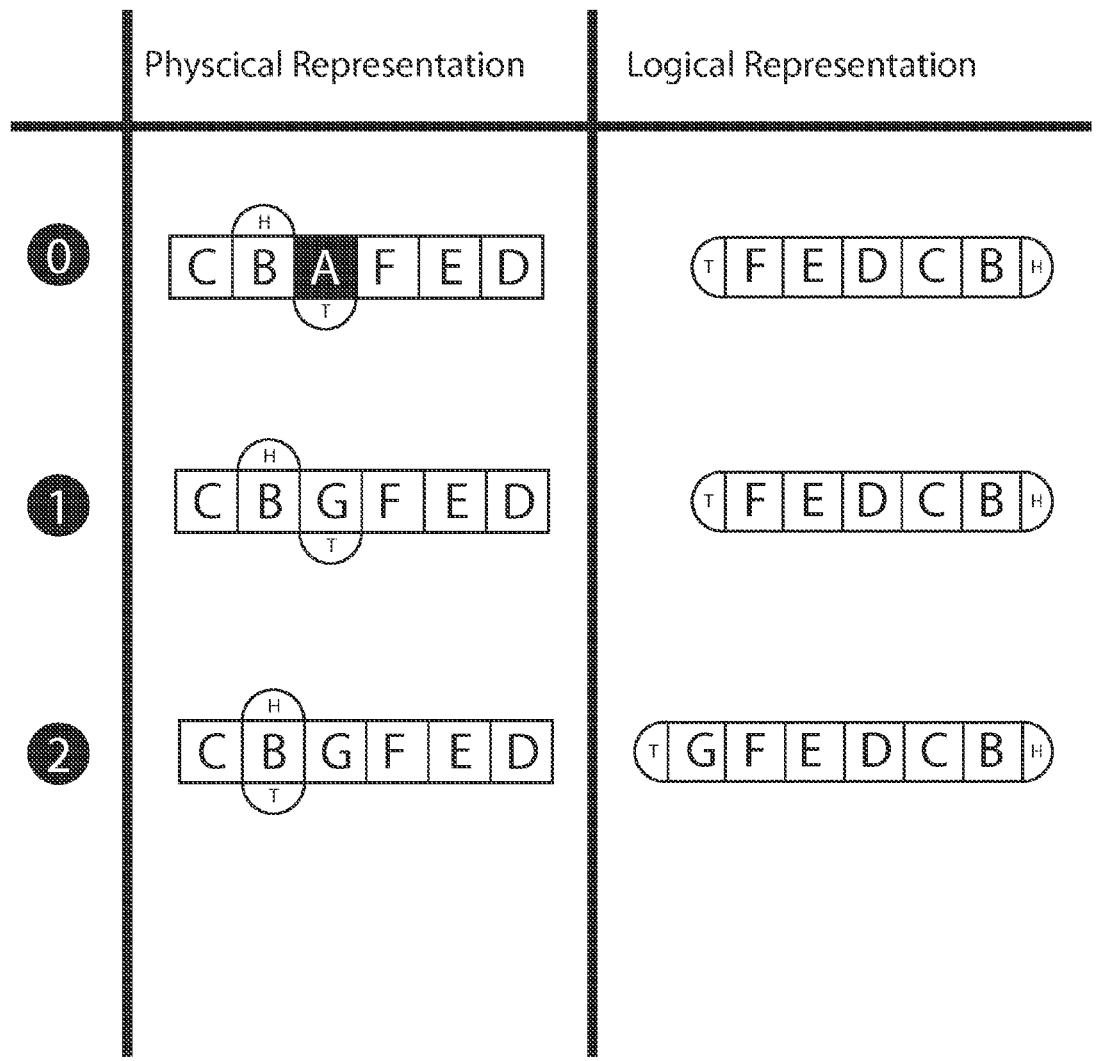
FIG. 7 shows the insertion of a data carrying object carrying the data "G" into the queue shown in step 2 of FIG. 6. At step 1, the data carrying object previously in the position of the array has been removed by the first processing thread, and the data carrying object with the new data ("G") has been inserted into the array by the first processing thread. At step 2, the tail pointer has been moved by the first processing thread.
Figure 8:
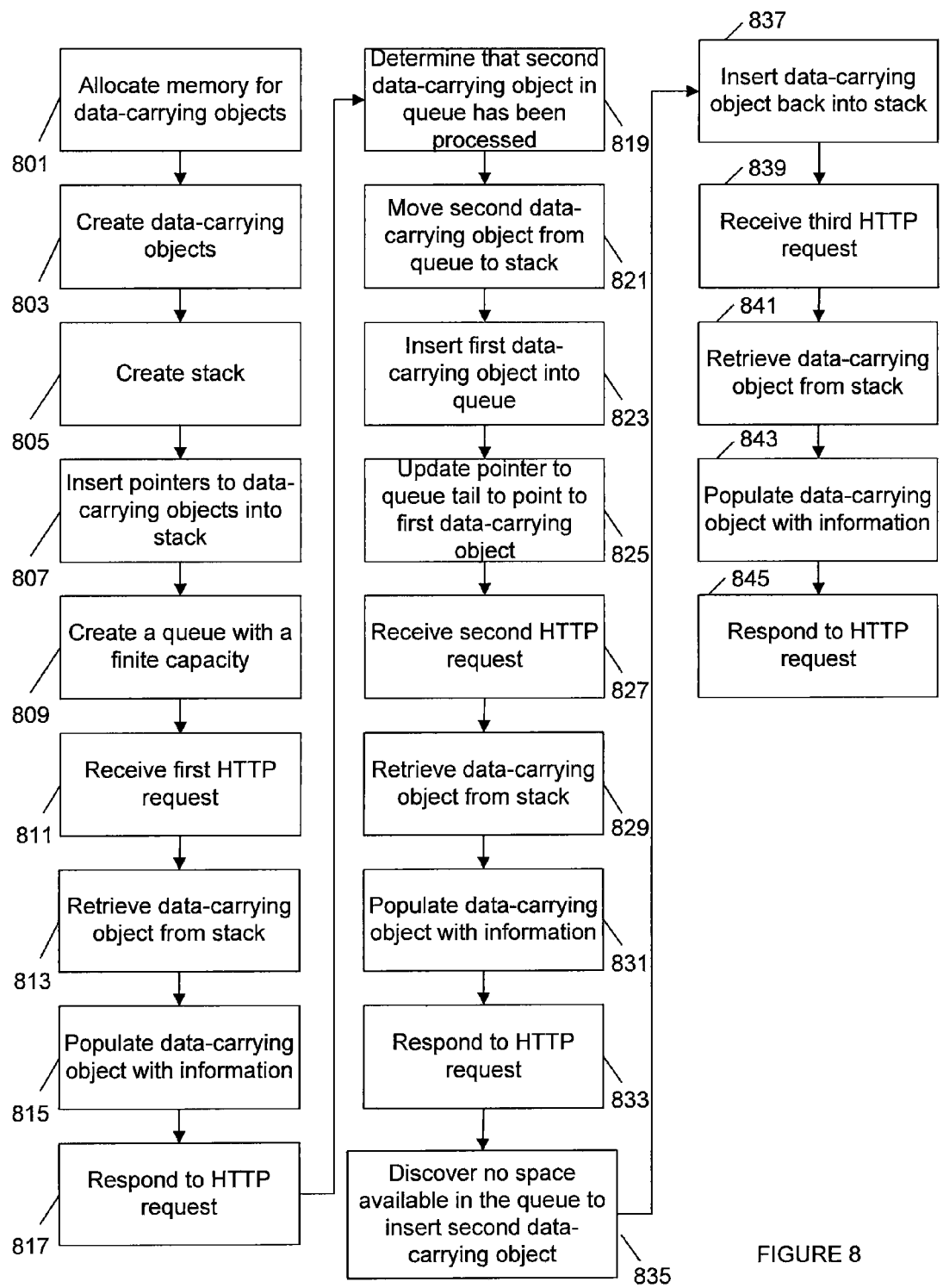

Embodiments of the present invention provide a method for passing data from a first execution thread to a second execution thread. The first execution thread may output data to be processed by the second thread. This data may be organized into sets containing particular pieces of information. Each set may be embedded in an object before it is passed to the second thread.

The object may be an instance of a class which takes up a fixed amount of memory. The class may specify a number of fields of a particular length. The memory size of an object instantiation of the class may be the sum of the length of the fields. For a web server log entry, the object may contain fields to hold a request time; a site-name; a host-name; a requester IP address; a server IP address; a request method; a request path, a request query-string; a username; a request port number; a browser user-agent; a response code; and a response time. The aforementioned fields are a selection of the possible fields for a web server log; the list is not exhaustive. When an embodiment of the invention is used for a different purpose than web server logging, the fields may be different.

When the objects are of a fixed size, it is possible to pre-allocate a portion of memory for a fixed number of objects. In an embodiment of the invention, an object may be comprised of 8 fields, each 256 bytes long, every object will take up 2048 bytes (2 KiB). A person skilled in the art will understand that the fields need not be of the same length. It is then possible to pre allocate memory for a fixed number of objects and create those objects before they will be put into use. In one embodiment of the invention 1024 objects will be made available for use to pass data from the first thread to the second thread. 2048 KiB (2 MiB) of memory may then be pre-allocated to hold these objects, and 1024 objects will be stored sequentially in the block of memory such that the first object begins at byte 0; the second object begins at byte 2048; and the nth object begins at byte $(n-1)2048$.

The class may be designed in such a way that there is no need to re-instantiate an object in order to use it to carry a different set of data. This allows the same section in memory to be re-used to transport different sets of data a number of times. The class may define a function that can be used to insert data that will overwrite all the fields in the class. In one embodiment of the invention the objects may be used to carry information for a web server log. The class may in this embodiment define two functions: one to insert logging data relevant to the request, and one to insert logging data relevant to the response. In one embodiment, the request data function may clear all the fields in the class, including those relating to the response. In another embodiment, the functions may be designed such that the request function overwrites one set of fields and the response function overwrites another set of fields, the union of the two sets being all the fields in the object. Embodiments of the invention do not require all the fields in an object to be overwritten each time it is used. An object may aggregate statistical data from each use or otherwise keep data.

In an embodiment of the invention, these objects are placed in a collection of data-carrying objects ready for use. This structure may be a stack. A stack may have a single end. Objects can be inserted into the stack by pushing them onto this end; similarly objects can be extracted from the stack by pulling them off this end. The first object to be pushed onto the stack will be the last to be pulled out. Embodiments of the invention may organize the objects in a queue or a linked list. The objects may be used as empty shells to hold data, and the order in which they are used may then be insignificant. The choice of data structure may be made solely with respect to what data structure is most efficient at handling insertions and extractions. In other embodiments of the invention, the objects may contain tracking data or id numbers enabling certain performance metrics to be collected. It may then be necessary to select a data-structure allowing for insertion and extraction in a particular order to enable some of these features.

When data is available in the first thread, an object may be retrieved from the stack of objects ready for use. The object may then be filled with relevant data. Depending on how the class is implemented, this may be done in a number of ways, including: calling a function of the class that will insert the data; and directly modifying public variables of the class. In some embodiments of the invention, data required before an object is to be passed to a second thread may be available at different times. Different embodiments of the invention may handle this differently. Aspects of this behavior relate to the enqueuing process and control of data loss and will be discussed in detail below.

When an object has been populated with the data required to be processed by the second thread it is inserted into a queue functioning as a buffer. The queue holds objects that the first thread has sent to the second thread for processing, but which have not yet been processed by the second thread.

In contrast to a stack, a queue is a first-in first out data structure. Objects are inserted into one end of the queue and extracted from another end of the queue, such that the object first inserted into the queue is the first object to be extracted from it.

In an embodiment of the invention, the queue is implemented as a circular array. A circular array may be of a fixed capacity. The array may consist of a linear array of a fixed size, a pointer to the head of the queue and a pointer to the tail of the queue. The linear array may be allocated an amount of memory large enough to hold the designated number of objects. The objects in the array may be defined such that the last object in the linear array is defined as being before the first object in the linear array in such a way that the ordering is circular. If the array contains three elements, {A, B, C}, A will be before B, which is before C, which again is before A.

The head pointer may be a pointer containing the memory address of the next object to be pulled off the queue, and the tail pointer may be a pointer containing the memory address of the object that was pushed onto the queue most recently. In another embodiment the tail pointer may contain the memory address of the next space in the queue to have an object pushed into it. For the remainder of this description, the latter definition will be used.

When the queue is empty both the head and the tail pointer will point to the same location. Similarly, both the head and the tail pointer will point to the same location when the queue is full. In one embodiment of the invention the queue contains a flag indicating whether it is empty of full which can be used to distinguish these two cases. In another embodiment, it is possible to inspect a position in the queue to determine whether the queue is full or empty. This may be implemented by incorporating a field indicating whether an object has been processed by the second thread into each object.

An object can be pulled from the queue by consuming the object at the location pointed to by the head pointer, and moving the head pointer to he next location. Similarly, an object can be inserted into the queue by inserting an object at the location pointed to by the tail pointer and moving the tail pointer to the next location.

In an embodiment of the invention, the first thread will check for space in the queue before inserting an object into it. In an embodiment of the invention, this may be done by inspecting the head and tail pointers, and if they point to the same location conducting an additional check to verify whether the queue is full or empty. In one embodiment of the invention, the queue does not contain the objects themselves, but rather contains pointers to the objects. This check may then consist of inspecting a flag in the queue or an object pointed to. In another embodiment, a special value may be assigned to a pointer when it does not point to an object at all.

The present invention does not require that the queue contain pointers to the data carrying objects. The queue may contain the objects themselves directly. In an embodiment of the invention, the objects are stored directly in a fixed size array forming part of the queue. In this embodiment of the invention, there may not be a need for the stack of objects ready for use, as an object could be filled with data while residing in the array, in a position which is not deemed to be in the queue due to the position of the head and tail pointers.

When there is only one thread inserting objects into the queue and only one thread extracting objects from it, the queue may be implemented as a lockless queue. If the first thread attempts to insert an object into the queue at the same time as the second thread attempts to extract an object from it, unexpected behavior may occur. In particular, data not yet processed by the second thread may be overwritten by the first thread and the second thread may attempt to read data not yet fully inserted by the first thread.

In order to ensure that no such unexpected behavior occurs, the respective threads may ensure that all data access is completed before the head or tail of the queue is moved. For instance, the first thread may first insert all the relevant data into the object to be inserted into the queue, then write a pointer to that object to the position pointed to by the tail pointer, and only when this is completed modify the tail pointer.

Moving the tail pointer will in most cases be an add operation, but when the pointer wraps around from the end of the linear array to the beginning of the array, the pointer will decrease. In an embodiment of the invention, moving the tail pointer is comprised by adding a value to it and computing the remainder of the sum when divided by another value. On some systems, where adding unsigned integers can cause overflow, this can be implemented as a single instruction if the size of the array is selected in such a way that the whole range of possible values of the integer can be used. On some systems this logic cannot be implemented with a single machine instruction, leaving open the possibility of an inconsistent pointer value. This is however not a problem, as only the first thread is accessing the tail pointer. The second thread never reads or writes to the tail pointer.

Similarly, when the second thread extracts an object from the queue, it may finish all processing of the data, then recycle the object as described below and when this is complete, move the head pointer. In some embodiments of the invention, moving the head pointer invokes the same logic as moving the tail pointer, and the same inconsistency issues apply. As only the second thread will write to the head pointer, there is no risk of writing an inconsistent value to the head pointer. In some embodiments of the invention, the first thread reads the head pointer to examine of the queue is full. In this case there is a need to ensure that an inconsistent value is never written to the head pointer. On most computer platforms it is possible to write a value, large enough to store a pointer, to memory in an atomic operation. A delayed update of the head pointer will then at worst result in the first thread treating the queue as full for the cycles after the second thread completes processing of the object but before it updates the head pointer.

Many modern CPUs optimize code while executing it. Some of these optimizations change the order in which instructions are executed. This reordering (out of order execution) is generally guaranteed not to change the output of a single thread, but may cause unexpected results when multiple threads are accessing the same area in memory. This optimization is closely tied to the memory-ordering model of the particular architecture. The IA-64 architecture implements store caching, which means that when one processor processes a store instruction, it can be cached before being sent to memory. The store becomes visible to that processor immediately, but not to other processors on the same system. Another processor on the same system could write to the same location in memory, and cache that in its own cache. It would take some time for both of these store operations to be committed to memory. Due to the caching, it could appear to both processors that their store operation executed first. Memory barrier instructions can be used to limit these optimizations and ensure that certain instructions are executed in a particular order. A common memory barrier is the "full fence" (e.g. MFENCE on x86, x64 and IA-64) barrier which will ensure that all memory read and write instructions before the bar are completed before any read and write instructions occurring after it. Some platforms also offer memory barriers specific to read (e.g. LFENCE on IA-64) operations or specific to write (e.g. SFENCE on IA-64) operations. A write only barrier would ensure that all write operations before the barrier would execute before all write operations after it. Read operations would however be subject to the normal optimizations of the platform and would thus be prone to out of order execution. The IA-64 architecture, and other Intel implementations of the x86 and x64 instruction sets, also offers Memory Type Range Registers (MTRRs) which enable different memory-ordering models to be applied to different sections of memory allowing the programmer to specify, without using specific memory barriers that loads and stored to that area of memory should be ordered more or less strictly.

Many compilers also implement similar optimizations that can result in out of order execution. Like the memory barrier instructions that can be used to limit out of order execution on the CPU, many compilers offer memory barriers that limit the extent of the optimization performed by the compiler. The C# language only offers a full memory barrier ("System.Threading.Thread.MemoryBarrier"); The GNU Compiler Collection (GCC) implements a similar barrier with the function ("_sync_synchronize"). These are both equivalent to the MFENCE instruction on the x86 platform. When the "System.Threading.Thread.MemoryBarrier" function is included in a piece of C# code it will function as a full memory barrier as sent to the CPU: It will prevent the compiler from optimizing the code such that memory reads and writes before the barrier occur after it or that reads or writes after it occur before it. It will also ensure that appropriate memory barrier instructions are issued to the CPU such that the CPU refrains from making any such optimizations. Some languages and compilers offer more extensive functionality relating to memory barriers. GCC implements a number of common functions where memory barriers would be used, known as "Atomic Builtins". The functions are all implemented in such a way that they execute as if they were a single CPU instruction although they cannot be implemented as a single instruction on many platforms. An example is the "_sync_bool_compare_and_swap" function which takes three parameters: a pointer to a location in memory, an old value and a new value. If the location in memory contains the old value, the new value is written to the same location in memory, overwriting the old value. These functions enable a developer to use these functions independently of whether the target platform offers such an instruction natively or if not, how such an operation must be implemented on a particular target platform. If the platform offers a compare and swap instruction, it will be used, otherwise, the appropriate memory barriers will be used to ensure the expected result.

In the lockless queue described above there is potential for unexpected behavior if the tail pointer is updates before the object is fully inserted into the queue. The insertion procedure may first populate the object with data, secondly insert a pointer into the queue pointing the location in memory where the object is stored, and finally update the tail pointer to indicate that an object has been inserted into the queue. An implementation of these three steps may be such that there is no overlap in the memory accessed by either of them, meaning that when optimizing performance, the compiler or processor could reorder memory read and write operations extensively without affecting the outcome of the procedure. It could for instance update the tail pointer before the object has been inserted into the queue. If this is done, the second thread would perceive the object as inserted into the queue and may then process the object before it is fully inserted into the queue. Depending on how the objects are recycled and the order of data population and pointer insertion, various unexpected issues may occur. If the pointer has not been updated, the previous object in that position in the array may be logged again. If the object has not been completely filled with data, a log entry may be generated that contains some new data, and some data from the previous use of the object.

One way of solving this issue is to insert a full memory barrier before updating the tail pointer. This ensures that the tail pointer is not updated until the data carrying object is fully populated with data and a pointer to it has been inserted into the queue.

A similar issue may occur when an object is extracted from the queue. When the second thread processes an object it may process the object in the queue, and then update the head pointer to indicate that the object has been consumed. In one embodiment of the invention, the second thread will copy the object at the head pointer, update the head pointer and then finish the required processing. In another embodiment, the second thread may leave the object in the queue while doing the necessary processing and only update the tail pointer after the processing is done. In both cases, if the code is executed out of order, there may be data loss. If the head pointer is updated before the data there is read, whether for copying of direct processing, the first thread may overwrite it before processing is complete.

Similarly, this problem may be solved by inserting a full memory barrier before updating the head pointer. This ensures that the object being processed is not overwritten by the first thread until the second thread is done copying or processing it.

An embodiment of the invention uses a memory barrier specific to write operations (eg. SFENCE on x86) in place of the full barriers to separate the updating of the head and tail pointers to separate the updating of these from the other parts of the insertion and extraction methods.

Another embodiment of the invention may use MTRRs to designate that the area in memory where the head and tail pointers are stored should be subject to a stricter memory-ordering model. Depending on the platform the invention is being implemented on, it may also be necessary to specify a stricter memory-ordering model for the fixed array containing pointers to the objects to be processed.

The queue may also be implemented as a linked list. A linked list may consist of a series of objects each containing a pointer to the next object in the list. In an embodiment of the invention, the linked list may contain a pointer to the head object of the list and a pointer to the tail object of the list. The objects may point from the head object to the tail object. When an object is inserted into the list, the tail pointer and the pointer in the tail object are updated to point to the new object. When an object is removed from the list, the head pointer is updated to point to the next element (the element pointed to by the head element).

When the queue is implemented using a fixed size array, there may be times when the queue is full when the first thread is ready to insert another element into it. In an embodiment of the invention, the first thread must wait until a space becomes available in the queue before inserting the object and continuing execution. In another embodiment of the invention the first thread will discard the object and continue executing. In an embodiment of the invention it will be more important to keep the first thread running than to ensure that all objects sent to the second thread are processed. If the first thread is a web server worker thread, no requests will be served if it is waiting for space to be come available in the queue for an object containing logging data. The invention could therefore be implemented such that serving of requests is given priority over logging all requests and responses. In an embodiment of the invention different action is taken for different types of log entries. It may be that there is less need to log requests served successfully than requests where an error occurred during the processing. The system may therefore be configured to wait until there is space in the queue if it is attempting to log a request where an error occurred in the processing, but discard the object if the request was successful. In an embodiment of the invention, the first thread maintains a counter to keep track of the number of objects that have been discarded.

In an embodiment of the invention where filling the data carrying object with data is processor intensive or time consuming, the first thread may check for space in the queue before filling the object with data in order to ensure that the process is not held up doing this if the object is to be discarded. There is however a possibility that space becomes available in the queue while the data carrying object is being populated. Checking for space after populating the object, may ensure that a higher portion of entries are processed by the second queue, but may reduce the operating rate of the first thread. If the first thread is a web server working thread and the second thread a logging thread, the former case may be appropriate where performance is critical, and the latter where a higher logging rate is desirable, but a 100% logging rate is not needed.

Similarly, in an embodiment of the invention where different parts of the data to be inserted into the data carrying object are available at different times, the first thread may check for available space in the queue before or after any data insertion. A person skilled in the art will appreciate the effect on the performance of the first thread, and the rate of objects discarded affected by such decisions.

In an embodiment of the invention, an object discarded due to lack of space in the queue may be inserted back into the stack of data carrying objects available for use. If the object is implemented such that all data in the object is overwritten when it is filled with data, inserting it back into the stack will ensure that the data contained in it will be cleared before it is inserted into the queue and passed to the second thread.

In an embodiment of the invention an object processed by the second thread is not deallocated or removed from the queue, it is simply marked as processed. All moving of the objects is delegated to the first thread. This marking can include an express flag or it can be implied by the moving of the head pointer of the queue. In an embodiment of the invention, the first thread will remove objects processed by the second thread from the queue before inserting a new one. After determining that there is space in the queue and determining what position into which to insert a new object, the first thread may inspect the position in the queue to see if there is an object in that position. If there is, it may move that object to the stack of data carrying objects ready for use such that it will be reused later. In an embodiment of the invention the queue contains pointers to the data carrying objects; an object may be moved from the queue to the stack by inserting a pointer to the object in the stack and writing a zero value, or another pointer value, into the position in the queue.

In an embodiment of the invention, the data carrying objects are stored in an area of memory that is pre-allocated for such objects. If the invention is implemented in a programming language that permits manual memory allocation, such as C or C++, the area of memory may be expressly allocated using a function such as "malloc". The objects may then be allocated to a particular point of this block and then initiated. A pointer to each of these objects may then be inserted into the stack of objects ready for use.

Another embodiment of the invention is implemented using a programming language that implements automatic memory allocation. It may therefore not be possible to obtain a continuous block of memory for these objects as memory to store them is automatically allocated as the objects are created. The objects may in this embodiment be allocated and initiated, ensuring that memory is allocated for them, by a virtual machine or other means not controlled by the programmer, and then be inserted into the stack of objects ready for use.

A person skilled in the art will understand that the invention does not require that all the sectors in the allocated memory are between two specified memory addresses and that the allocated memory comprises all addresses between the two boundary addresses, but may be fragmented or otherwise distributed. Memory may nonetheless be allocated for these objects at one point in time and not change as objects are passed from the first thread to the second thread and back, such that the memory assigned remains the same during the processing. A person skilled in the art will appreciate that the invention is not limited to cases where the memory allocated is fixed at the initiation of the threads and must stay fixed until they are terminated. Embodiments of the invention may include functionality to allocate additional memory and instantiate additional objects if there is a need to increase the size of the queue or more memory becomes available to the system. Similarly, objects can be discarded and memory can be freed up if fewer objects are needed or the system needs to allocate more memory to other processes.

Some programming languages, such as Java and C# do not permit express control of pointers when addressing objects. A person skilled in the art will understand that references to the objects can nonetheless be moved from an array in a queue to a stack and back in a manner similar to that described above, and that express manipulation of pointers or object references is not a requirement of the present invention.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for passing information about HTTP requests from a web-server worker thread to a logging thread that writes a log to disk, comprising:

for the worker thread:

allocating a block of memory for storing data-carrying objects;

creating a number of data-carrying objects sufficient to fill the block of memory and storing them in the block of memory;
creating a stack for holding empty data-carrying objects;
inserting into the stack a pointer to each of the data-carrying objects that are stored in the block of memory;
creating a queue having a finite capacity to act as a buffer for data-carrying objects to be processed by the logging thread, the queue containing an array, a pointer to the head of the queue and a pointer to the tail of the queue, wherein the head of the queue is the location of the next data-carrying object to be processed by the logging thread and the tail of the queue is the location of last object inserted into the queue;
receiving a first HTTP request;
retrieving a first data-carrying object from the stack;
at least partly populating the first data-carrying object with information based upon the first HTTP request;
responding to the first request;
determining that a second data-carrying object in the queue has already been processed by the logging thread;
moving the second data-carrying object from the queue to the top of the stack;
inserting the first data-carrying object into the position in the queue formerly occupied by the second data-carrying object;
updating the pointer to the tail of the queue to point to the position in the queue of the first data-carrying object;
receiving a second HTTP request;
retrieving the second data-carrying object from the stack;
at least partly populating the second data-carrying object with information based upon the second HTTP request;
responding to the second request;
discovering that there is no space available in the queue into which to insert the second data-carrying object;
inserting the second data-carrying object back into the stack;
retrieving the second data-carrying object from the stack;
receiving a third HTTP request;
at least partly populating the second data-carrying object retrieved from the stack with information based upon the third HTTP request; and
responding to the third request; and
providing information related to the first, the second, and the third HTTP request to the logging thread to write the log to disk.

2. The method of claim 1, wherein the queue is a lockless queue.

3. The method of claim 2, wherein the lockless queue is implemented as a circular array with a fixed capacity.

4. The method of claim 2, wherein the lockless queue is implemented as a linked list.

5. The method of claim 1, wherein moving the second object comprises inserting a pointer to the object into the stack and overwriting the pointer to it in the queue.

6. The method of claim 1, wherein allocating memory comprises allocating a continuous block of memory.

7. The method of claim 1, wherein the data used to populate the retrieved object is discarded.

8. The method of claim 1, wherein discovering that there is no space available in the queue comprises inspecting a position in the queue.

9. The method of claim 1, wherein the queue contains a flag indicating whether the queue is empty or full.

10. The method of claim 1, wherein the logging thread produces a log with summary information about each HTTP request and its respective response.

11. The method of claim 1, further comprising:
for the worker thread, determining that the queue is empty when the pointer to the head and the pointer of the tail point to the same location.

12. A computer-implemented system comprising:
at least one processor; and
memory storing instructions that, when executed by the at least one processor, perform a method for passing information about HTTP requests from a worker thread to a logging thread, wherein the worker thread is configured to:
allocate a block of memory for storing data-carrying objects;
create a number of data-carrying objects sufficient to fill the block of memory and store them in the block of memory;
create a stack for holding empty data-carrying objects;
insert into the stack a pointer to each of the data-carrying objects that are stored in the block of memory;
create a queue having a finite capacity to act as a buffer for data-carrying objects to be processed by the logging thread, the queue containing an array, a pointer to the head of the queue and a pointer to the tail of the queue, wherein the head of the queue is the location of the next data-carrying object to be processed by the logging thread and the tail of the queue is the location of last object inserted into the queue;
receive a first HTTP request;
retrieve a first data-carrying object from the stack;
at least partly populate the first data-carrying object with information based upon the first HTTP request;
respond to the first request;
determine that a second data-carrying object in the queue has already been processed by the logging thread;
move the second data-carrying object from the queue to the top of the stack;
insert the first data-carrying object into the position in the queue formerly occupied by the second data-carrying object;
update the pointer to the tail of the queue to point to the position in the queue of the first data-carrying object;
receive a second HTTP request;
retrieve the second data-carrying object from the stack;
at least partly populate the second data-carrying object with information based upon the second HTTP request;
respond to the second request;
discover that there is no space available in the queue into which to insert the second data-carrying object;
insert the second data-carrying object back into the stack;
retrieve the second data-carrying object from the stack;
receive a third HTTP request;
at least partly populate the second data-carrying object retrieved from the stack with information based upon the third HTTP request; and
respond to the third request; and
provide information related to the first, the second, and the third HTTP request to the logging thread to write the log to disk.

13. The system of claim 12, wherein the queue is a lockless queue.

14. The system of claim 13, wherein the lockless queue is implemented as a circular array with a fixed capacity.

15. The system of claim 13, wherein the lockless queue is implemented as a linked list.

16. The system of claim 12, wherein moving the second object comprises inserting a pointer to the object into the stack and overwriting the pointer to it in the queue.

17. The system of claim 12, wherein allocating memory comprises allocating a continuous block of memory.

18. The system of claim 12, wherein the data used to populate the retrieved object is discarded.

19. The system of claim 12, wherein discovering that there is no space available in the queue comprises inspecting a position in the queue.

20. The system of claim 12, wherein the queue contains a flag indicating whether the queue is empty or full.

21. The system of claim 12, wherein the logging thread is configured to produce a log with summary information about each HTTP request and its respective response.

22. The system of claim 12, wherein the worker thread is further configured to:
   determine that the queue is empty when the pointer to the head and the pointer of the tail point to the same location.

* * * * *